J. P. WEBB.
ANIMAL TRAP.
APPLICATION FILED SEPT. 10, 1921.
1,402,197.
Patented Jan. 3, 1922.
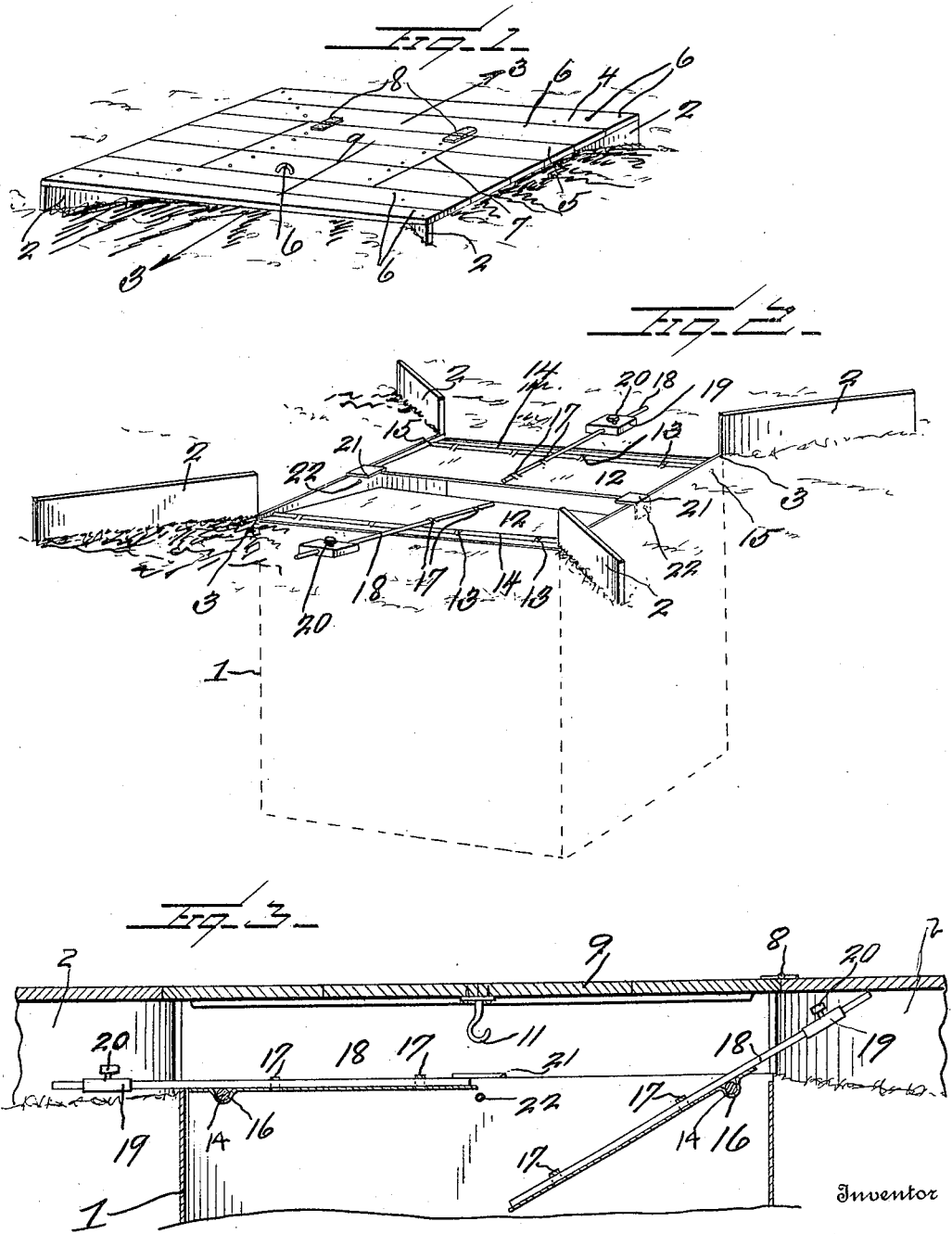
Inventor
J. P. Webb
By Watson E. Coleman
Attorney

# UNITED STATES PATENT OFFICE.

JAMES PERRY WEBB, OF FREDERICK, OKLAHOMA, ASSIGNOR OF FORTY-EIGHT PER CENT TO CHARLES F. NICHOLS, OF FREDERICK, OKLAHOMA.

ANIMAL TRAP.

1,402,197. Specification of Letters Patent. Patented Jan. 3, 1922.

Application filed September 10, 1921. Serial No. 499,594.

*To all whom it may concern:*

Be it known that I, JAMES PERRY WEBB, a citizen of the United States, residing at Frederick, in the county of Tillman and State of Oklahoma, have invented certain new and useful Improvements in Animal Traps, of which the following is a specification, reference being had to the accompanying drawings.

It is the purpose of the present invention to provide a device of this kind for trapping animals, particularly rats and mice, and one wherein the housing or trap proper is embedded below the surface traveled by the animal, together with a platform spaced above the surface, under which the animal may crawl, in order to gain access to the bait suspended over a pair of gravity actuated trap doors, so that when the animal reaches the bait, the weight of the animal will actuate the doors, in which case the animal will drop into the housing or trap proper. The doors will automatically close due to the provision of counterbalancing weights.

Another purpose is the provision of means for holding the platform spaced above the surface, so that the animal may crawl thereunder, and due to this fact, the animal is led to believe that it is reaching a place of hiding or safety.

A still further purpose is the provision of means for limiting the trap doors in their normal positions for trapping the animal.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective showing the platform for the trap, it being understood that the trap proper is embedded in the ground below the platform;

Figure 2 is a view in perspective of the paltform removed, showing the housing or trap proper embedded in the ground, and showing the gravity actuated trap doors, one partly open; and Figure 3 is a sectional view on line 3—3 of Figure 1.

Referring to the drawings, 1 designates a housing, which may be in the form of a box, made of any suitable material preferably sheet metal, and which is embedded in the ground, so that its upper marginal edge is substantially flush with the upper surface of the ground. It is obvious that the housing or box or other container may be embedded below the surface of the floor, in a dwelling, or in a stable, or any other suitable place, where it is necessary to trap rats, mice and the like, or may be used in the forest or elsewhere.

Supported edgewise on the ground, preferably partially inserted in the ground, and extending from the four corners of the housing or box are supports 2, which may be connected in any suitable manner as at 3 to the housing. These supports 2 support a platform 4, which may be made up of a suitable number of boards or the like 5. These boards are secured at 6 to the upper edges of the supports 2, in order to hold the platform rigid.

The platform 5 is provided with an opening 7, and hinged to one edge thereof as at 8 is a door or closure 9, provided with a handle 10. The under surface of the door is provided with a hook 11 upon which the bait for the animal may be suspended. The supports 2 diverge outwardly in a direction laterally from the housing, thereby providing passages through which the animal may pass toward and upon the trap doors 12.

The doors are constructed preferably of sheet metal and are provided with struck up straps 13, through which shafts 14 extend. The shafts 14 are mounted in suitable bearings 15 in opposite sides of the housing or boxing, in order to support the trap doors hingedly in position as shown in Figures 2 and 3. Where the trap doors engage the shafts, the doors are bent to form grooves 16, so that the shafts are substantially flush with the upper surfaces of the doors.

Additional straps 17 are struck up from the doors to receive the rods 18, which extend at right angles to the shafts or rods 14. The rods 18 extend laterally and beyond the sides of the housing or box 1, and their extended parts carry weights 19, which are held in adjusted positions by means of the set screws 20. Angle abutment plates 21 are riveted at 22 to certain of the sides of the housing or box 1, and have certain of their lateral portions overlying the opposite upper edges of the housing, in the path of the trap doors, for the purpose of limiting them in their closed positions, due to the gravity of the weights 19.

In the operation, the animal approaches the platform, and as it is spaced upwardly from the surface of the ground, the animal crawls thereunder, between any two of the guides or walls 2, and being attracted by the bait suspended on the hook 11, the animal crawls upon the trap doors, and since its weight overbalances the weight 19, one or the other of the trap doors tilts, and the animal slides into the housing or box 1. In order to remove the trapped animals the door 9 may be raised, then one or the other or both of the rods 18 are detached from the trap doors, which will permit them to swing downwardly, permitting ready access to the interior of the trap, whereby the trapped animals may be removed.

The weights 19 are adjustable upon the rods 18, in order to regulate the opening action of the trap doors according to the size of the animal expected to be caught. The platform acts as an abutment against which the rods 18 engage, to limit the trap doors in their opening movements.

The invention having been set forth, what is claimed as being useful is:

In an animal trap, the combination with a housing to be embedded in the ground whereby its upper edge is flush with the surface thereof, of a pair of gravity actuated trap doors closing the upper end of the housing, supports extending from diagonal opposite portions of the upper portion of the housing and disposed in a plane at right angles to the surface of the ground, and a platform connected to the upper edges of the surface supports, thereby holding the platform spaced above the ground, thereby providing passages through which an animal may pass in order to crawl upon the trap doors.

In testimony whereof I hereunto affix my signature.

JAMES PERRY WEBB.